(12) United States Patent
Busch et al.

(10) Patent No.: US 8,927,135 B2
(45) Date of Patent: Jan. 6, 2015

(54) MICROPOROUS FOIL FOR BATTERIES HAVING SHUTDOWN FUNCTION

(75) Inventors: Detlef Busch, Saarlouis (DE); Bertram Schmitz, Sarreguemines (FR)

(73) Assignee: Treofan Germany GmbH & Co. KG (DE)

( * ) Notice: Subject to any disclaimer, the term of this patent is extended or adjusted under 35 U.S.C. 154(b) by 57 days.

(21) Appl. No.: 13/379,227

(22) PCT Filed: Jun. 9, 2010

(86) PCT No.: PCT/EP2010/003439
§ 371 (c)(1),
(2), (4) Date: Mar. 13, 2012

(87) PCT Pub. No.: WO2010/145770
PCT Pub. Date: Dec. 23, 2010

(65) Prior Publication Data
US 2012/0171548 A1    Jul. 5, 2012

(30) Foreign Application Priority Data
Jun. 20, 2009  (DE) .................. 10 2009 025 732

(51) Int. Cl.
*H01M 2/16* (2006.01)
*B32B 27/32* (2006.01)

(52) U.S. Cl.
CPC ............. *H01M 2/1653* (2013.01); *B32B 27/32* (2013.01)
USPC .................... 429/145; 428/315.5; 428/315.7; 428/315.9; 264/46.1

(58) Field of Classification Search
CPC ......... H01M 2/16; B29C 47/06; B29C 55/00; B29C 67/20; B29D 7/00; B32B 27/08; B32B 3/26

USPC .................. 429/145; 428/315.5, 315.7, 315.9; 264/46.1

See application file for complete search history.

(56) References Cited

U.S. PATENT DOCUMENTS

| | | | |
|---|---|---|---|
| 5,691,077 A | 11/1997 | Yu | |
| 6,300,415 B1 * | 10/2001 | Okayama et al. | 525/191 |
| 6,596,814 B2 | 7/2003 | Kim et al. | |
| 2005/0212183 A1 * | 9/2005 | Busch et al. | 264/509 |
| 2006/0177632 A1 | 8/2006 | Jacoby | |
| 2010/0255287 A1 | 10/2010 | Schmitz et al. | |
| 2011/0064934 A1 | 3/2011 | Peters et al. | |
| 2011/0064989 A1 | 3/2011 | Peters et al. | |
| 2011/0064990 A1 | 3/2011 | Mohr et al. | |

FOREIGN PATENT DOCUMENTS

| | | | | |
|---|---|---|---|---|
| CN | 101035676 A | | 9/2007 | |
| DE | AU2009242416 | * | 11/2009 | 428/220 |
| EP | 0632095 A2 | | 1/1995 | |
| EP | 0668156 A1 | | 8/1995 | |
| EP | 0682376 A1 | | 11/1995 | |
| EP | 0794583 A1 | | 9/1997 | |
| EP | 0967671 A2 | | 12/1999 | |
| EP | 1369221 A1 | | 12/2003 | |
| EP | 1950821 A1 | | 7/2008 | |
| WO | WO-2007/039521 A1 | | 4/2007 | |
| WO | WO-2009/132801 A1 | | 11/2009 | |
| WO | WO-2009/132802 A2 | | 11/2009 | |
| WO | WO-2009/132803 A2 | | 11/2009 | |

* cited by examiner

Primary Examiner — Gary Harris
(74) Attorney, Agent, or Firm — Drinker Biddle & Reath LLP

(57) ABSTRACT

Single-layer or multilayer, biaxially oriented, microporous foil having a shutdown function, which comprises at least one shutdown layer I, which comprises propylene homopolymer and ss-nucleating agent and polyethylene.

22 Claims, No Drawings

MICROPOROUS FOIL FOR BATTERIES HAVING SHUTDOWN FUNCTION

RELATED APPLICATIONS

This application is a national stage application (under 35 U.S.C. §371) of PCT/EP2010/003439, filed Jun. 9, 2010, which claims benefit of German Application No. 10 2009 025 732.2, filed Jun. 20, 2009.

The present invention relates to a multilayer microporous foil and use thereof as a separator.

Modern devices require an energy source such as batteries or rechargeable batteries that enable the device to be used without restriction in terms of location. Batteries have a disadvantage in that they have to be disposed of. Consequently, more and more use is being made of rechargeable batteries (secondary batteries), which can be can be recharged repeatedly with the aid of chargers connected to the electricity mains. For example, if used correctly nickel-cadmium rechargeable batteries (NiCd rechargeable batteries) can offer a service life extending to about 1000 charge cycles.

Batteries and rechargeable batteries always include two electrodes, which are immersed in an electrolyte solution, and a separator, which separates the anode and the cathode. The various rechargeable battery types differ in the electrode material used, the electrolyte, and the separator used. The task of the battery separator is to keep the cathode apart from the anode in batteries, or the negative electrode apart from the positive electrode in rechargeable batteries. The separator must be a barrier that isolates the two electrodes from one another electrically in order to prevent internal short circuits. At the same time, however, the separator must be permeable to ions to enable the electrochemical reactions to take place in the cell.

A battery separator must be thin, so that the internal resistance is as low as possible and a high packing density can be achieved. This is the only way to ensure good performance characteristics and high capacitances. In addition, the separators have to absorb the electrolyte and assure ion exchange when the cells are full. Whereas previously fabrics and similar were used, this function is served mainly by fine-pored materials such as fleeces and membranes nowadays.

In lithium batteries, the occurrence of short-circuits is a problem. Under thermal load, the battery separator in lithium ion batteries can sometimes melt, leading to a short-circuit with disastrous results. Similar risks exist if the lithium batteries are damaged mechanically or are overcharged due to poor electronics in chargers.

In order to increase the safety of lithium ion batteries, shut down separators (shut down membranes) were developed in the past. These special separators close their pores very rapidly at a given temperature, which is significantly lower than the melting point or ignition point of lithium. In this way, the catastrophic consequences of a short-circuit in lithium batteries are largely prevented.

At the same time, however, it is also desirable for the separators to have great mechanical strength, is assured by materials with high melting temperatures. Thus, polypropylene membranes are advantageous, for example, because of their good puncture resistance, but the melting point of polypropylene is approximately 164° C., very close to the flame point of lithium (170° C.).

From the prior art, it is known to combine polypropylene membranes with additional layers, which are constructed from materials with a lower melting point, polyethylene for example. Of course modifications of such kind must not impair the other properties of the separators, such as porosity, nor obstruct ion migration. However, fitting polyethylene layers has an extremely detrimental overall effect on the permeability and mechanical strength of the separator. Moreover, the adhesion of the polyethylene layers to polypropylene is problematical, so that these layers can only be combined by lamination, or only selected polymers of these two classes can be co-extruded.

There are essentially four different methods known in the prior art for producing foils with high porosities: filler material methods; cold drawing, extraction methods, and β-crystallite methods. The fundamental differences between these methods lie in the various mechanisms via which the pores are produced in the membrane.

For example, porous foils may be produced by adding very large quantities of filler materials. The pores are created during drawing due to the incompatibility of the filler materials with the polymer matrix. In many applications, the large quantities of filler materials of up to 40% by weight are accompanied by undesirable side effects. For example, the mechanical strength of these porous foils is impaired by the high quantities of filler materials despite drawing. The pore size distribution is also very wide, and consequently these porous foils are generally unsuitable for use in lithium ion batteries.

In the "extraction methods", the pores are created in principle by the release of a component from the polymer matrix by suitable solvents. In this respect, a wide range of variants have been developed, differing in the nature of the additives and the appropriate solvents. Both organic and inorganic additives may be extracted. This extraction may be performed as the last process step in manufacturing the foil, or it may be combined with a subsequent drawing step.

An older method, which has however proven successful in practice, is based on drawing the polymer matrix at very low temperatures (cold drawing). For this, the foil is first extruded in the normal way, and then tempered for several hours to increase its crystalline component. In the next process step, the foil is drawn lengthwise at very low temperatures to create a large number of flaws in the form of very tiny micro-tears. This flawed pre-drawn foil is then drawn in the same direction again, but at higher temperatures and with higher factors and this enlarges the micro-tears into pores that form a network-like structure. These foils exhibit high porosities as well as good mechanical strengths in the direction in which they are drawn, generally the lengthwise direction. However, their mechanical strength in the transverse direction remains unsatisfactory, so that their perforation resistance is poor, and they are highly susceptible to splicing in the longitudinal direction. Overall, the method is cost-intensive.

Another known method for producing porous foils is based on mixing β-nucleating agents in with polypropylene. Because of the β-nucleating agent, the polypropylene forms high concentrations of "β-crystallites" as the molten mass cools down. During the subsequent lengthwise drawing, the β-phase is converted into the alpha-modification of the polypropylene. Since these different crystalline forms have different densities, a large number of microscopic flaws are also created initially in this step, and these are also enlarged to form pores by drawing. The foils produced according to this method have high porosities and good mechanical strengths in the longitudinal and transverse directions, and they are very cost-effective. These foils will be referred to as β-foils in the following.

It is known that porous foils that are produced according to the extraction method may be provided with a shutdown function by adding a component with a low melting point. Since orientation is carried out first in this method, and the pores are then created in the oriented foil by extraction, the low-melting component cannot impair the pore formation. Membranes with shutdown function are therefore often produced according to this method.

Low-melting components for a shutdown function may also be added in the cold drawing method. The first drawing step must be carried out at very low temperatures in any case in order to create the micro-tears in the first place. The second orientation step is generally carried out in the same direction, usually MD, and may therefore take place at a relatively low temperature as well, since the molecule chains do not undergo any re-orientation. The mechanical properties of these foils are unsatisfactory, particularly in the transverse direction.

As an alternative, certain methods have been developed in which various monolayer foils having different functions are first produced separately, and they are then joined together, that is to say laminated, to form a membrane with shutdown function. In this case, it is possible to optimise each layer with regard to its desired function without running the risk that the shutdown function might impair the membrane's porosity. Of course, these methods are very costly and technically complex.

The disadvantage of membranes made from β-porous foils is that until now it has only been possible to equip them with a corresponding shutdown function by laminating them in this way. In order to create satisfactory porosities and the desired mechanical strengths using β-crystallites and subsequent biaxial drawing, the foil must be drawn transversely following its lengthwise orientation. Transverse drawing of a foil that has already been oriented longitudinally de facto entails changing the orientation of the polymer molecules and depends on considerably greater mobility of the polymer chains than is needed for the first orientation of the undrawn polymers in the lengthwise direction. Therefore, transverse drawing of a polypropylene foil that has already been oriented longitudinally has to be carried out high temperature, above the desired shutdown temperature.

During experiments relating to the present invention, it was therefore expected that the pores created by lengthwise and transverse drawing would be closed up again at the same time by a low-melting component in the shutdown layer during transverse drawing in such manner that the porosity would be significantly impaired. The degree to which the transverse drawing temperature can be lowered is limited by mechanical constraints, since the longitudinally drawn polypropylene can only be drawn transversely at temperatures of at least 145° C. and is generally transversely drawn at temperatures from 150 to 160° C. Accordingly—except for lamination—there is no method known from the prior art that enables β-porous foils to be provided with a shutdown function.

In the prior art, for example in WO 2009/132802, WO2009/132803 or WO2009/132801, microporous foils are described that contain block copolymers in addition to the propylene homopolymer. In general this block copolymer has a lower melting point than the propylene homopolymer. The melting range of the block copolymer begins at a temperature in the range from 50° C. to 120° C. If higher temperatures occur inside the battery, the pores are quickly closed by the addition of the special block copolymer in the shutdown layer in such manner that further passage of gases or ions is rendered entirely impossible and the chain reaction is halted. The block copolymer also has an advantageous effect on the capability of the polymer mixture to be drawn. In particular, if enough of the block copolymer is present, it makes it possible to lower the transverse drawing temperature. For these reasons, the addition of block copolymers to microporous foils with shutdown function is an essential component. During the investigations relating to the present invention, it was expected that it would be impossible to produce a microporous foil with shutdown function without a block copolymer. It was expected that the drawing temperatures, particularly the transverse drawing temperatures, would have to be so high that the pores in the shutdown layer would close up during transverse drawing, significantly impairing the porosity.

The known microporous foils are also in need of improvement with regard to their shrinkage, that is to say they should exhibit less shrinkage under thermal load. A higher modulus of elasticity and greater stiffness are also to be desired.

The object of the present invention was to provide a porous foil or separator for batteries, which should possess a shutdown function, high porosities and excellent mechanical strength, good stiffness and low shrinkage. In addition, it should be possible to manufacture the membrane by simple, environmentally compatible, inexpensive methods.

The object underlying the invention is solved with a monolayer or multilayer, biaxially oriented microporous foil with shutdown function whose microporosity is produced by the conversion of β-crystalline polypropylene when the foil is drawn, and which comprises at least one shutdown layer I, wherein the shutdown layer contains propylene homopolymer and <1% by weight propylene block copolymer and β-nucleating agents and polyethylene, and wherein the foil has a Gurley number of 50 to 5000 s, an E-modulus in the lengthwise direction of >300 N/mm$^2$ and in the transverse direction of >500 N/mm$^2$, and after exposure to a temperature of 130° C. for five minutes the foil has a Gurley number of at least 5000 s, the Gurley value being at least 1000 s higher after this temperature treatment than before.

Surprisingly, the foil according to the invention has high porosities, very good mechanical strength as well as the desired shutdown function. The Gurley number of the foil according to the invention is generally in a range from 50-5000 s; preferably from 100 to 2000 s, particularly from 120 to 800 s. The gas permeability of the foil is reduced significantly when the foil is exposed to an elevated temperature. For the purposes of the present invention, this function is called the "shutdown function". In principle, this is determined according to the method described for determining gas permeability, whereby this measurement is taken at the foil before and after thermal loading at 130° C. For example, the Gurley number of the foil increases to at least 5000 s, preferably to at least 8000 s, particularly to at least 10,000 to 250,000 s after thermal treatment for five minutes at 130° C., and the Gurley number increases during this thermal treatment by at least 1000 s, preferably by 5000 to 250,000 s, and particularly by 10,000 to 200,000 s. The Gurley number indicates (in seconds) how long it takes for a given quantity of air (100 cm$^3$) to diffuse through a defined area of the foil (1 inch$^2$). The maximum value may thus be an infinite period. Therefore, the second Gurley number, that is to say the Gurley value after thermal treatment, above which a shutdown function is described, is a range with no upper limit. Ideally, the membrane is completely impermeable after the thermal treatment and does not allow any air to pass at all, that is to say the Gurley number is then infinity. The e-modulus of the foil according to the invention is 300 to 1800 N/mm2, preferably 400 to 1500 N/mm2, particularly 600 to 1200 N/mm2 in the lengthwise direction, and 500 to 3000 N/mm2, preferably 800 to 2500 N/mm2, particularly 1000 to 2500 N/mm2 in the transverse direction.

In its inventive use as a separator in batteries, the microporous foil is able to effectively prevent the consequences of a short-circuit. If elevated temperatures are generated inside the battery as a consequence of a short-circuit, the pores of the separator are quickly closed by the shutdown layer in such manner that gases and ions are no longer able to pass through the membrane and the chain reaction is terminated.

Surprisingly, the foil without a block copolymer in its shutdown layer exhibits very high porosities despite the addition of polyethylene. This is surprising for two reasons. The polyethylene component of, for example, 20% by weight in the polymer mixture of the shutdown layer causes a reduction in the proportion of β-crystallites in the cooled, undrawn polymer melt of the shutdown layer, and thus also a reduced β-crystallite content in the foil. It is commonly held that the porosity in polypropylene foils without a polyethylene additive is directly dependent on the β-crystallite component. The fewer β-crystallites the cooled polypropylene foil contains, the lower the porosity that forms after the polypropylene foil is drawn. Surprisingly, however, the porosity of the foil according to the invention containing polyethylene in the shutdown layer was no poorer than a polypropylene foil of similar composition and produced in the same way that contained polyethylene in the shutdown layer, even though the β-crystallite content in the undrawn pre-film is lower. It was also expected that without a block copolymer in the shutdown layer the transverse drawing temperature must be set so high that the polyethylene in the shutdown layer would cause the pores to close during drawing in the transverse direction because of its low melting point, so that the effect of the good porosity is limited for this reason as well. Surprisingly, it is possible to adjust the transverse drawing temperature for drawing the polypropylene foil such that the polyethylene does not negatively affect the porosity, but the foil without a block copolymer in the shutdown layer may still be drawn to a point at which good mechanical strengths are obtained and at the same time the foil exhibits surprisingly low shrinkage. In general, the shrinkage values of the foil at 100° C./60 min in a range from 1 to <6%, preferably 1.5 to 4% in the lengthwise and/or transverse direction. It was also found that the quantity of polyethylene that is sufficient to trigger a shutdown effect does not also ruin the porosity. Surprisingly, therefore, it is possible to create a foil that has high porosities due to the biaxial drawing of β-crystallites, good mechanical strengths, low shrinkage, good stiffness and a shutdown effect.

The foil according to the invention comprises a shutdown layer I and possibly at least one additional porous layer II.

The shutdown layer of the foil contains a propylene homopolymer, at least one β-nucleating agent, and polyethylene, and usual additives, such as stabilisers neutralisers in the effective quantities thereof as necessary.

Shutdown layer I generally contains 45 to 85% by weight, preferably 50 to 70% by weight propylene homopolymer and 15 to 55% by weight polyethylene, preferably 30 to 50% by weight and 0.001 to 5% by weight, preferably 50-10,000 ppm of at least one β-nucleating agent, relative to the weight of the shutdown layer. If larger quantities of up to 5% by weight nucleating agent are used, the proportion of propylene homopolymer is reduced correspondingly. In addition, the shutdown layer may also contain usual stabilisers and neutralisers as well as other additives in the usual, low quantities of less than 2% by weight if required.

For the purposes of this invention, the preferred polyethylenes for use in the shutdown layer are HDPE or MDPE. These polyethylenes such as HDPE and MDPE are generally incompatible with polypropylene, and in a mixture with polypropylene they form a separate phase. The existence of a separate phase is revealed in a DSC measurement for example by the presence of a separate melt peak in the region of the melting temperature for polyethylene, generally in a range from 115-140° C. HDPE generally has an MFI (50 N/190° C.) greater than 0.1 to 50 g/10 min, preferably 0.6 to 20 g/10 min, measured in accordance with DIN 53 735, and a viscosity number, measured in accordance with DIN 53 728 Part 4 or ISO 1191, in a range from 100 to 450 cm$^3$/g, preferably from 120 to 280 cm$^3$/g. Crystallinity is generally 35 to 80%, preferably 50 to 80%. The density, measured at 23° C. in accordance with DIN 53 479 method A or ISO 1183, is preferably in the range from >0.94 to 0.97 g/cm$^3$. The melting point, measured by DSC (maximum of the melt curve, heating rate 10K/min), is between 120 and 145° C., preferably 125 and 140° C. Suitable MDPE generally has an MFI (50 N/190° C.) greater than 0.1 to 50 g/10 min, preferably 0.6 to 20 g/10 min, measured in accordance with DIN 53 735. The density, measured at 23° C. in accordance with DIN 53 479 method A or ISO 1183, is in the range from >0.925 to 0.94 g/cm$^3$. The melting point, measured by DSC (maximum of the melt curve, heating rate 10K/min), is between 115 and 130° C., preferably 120-125° C.

For the purposes of the present invention, polyethylenes having a molecular weight Mw less than 700.00, particularly 300,000 to <500,000 are suitable. Preferred HDPE and MDPE polymers also contain no comonomer component or only a very small comonomer component of less than 2% by weight.

It is also advantageous that the polyethylene has a narrow melting range. This means that in a DSC of the polyethylene the beginning of the melting range and the end of the melting range are separated by not more than 10K, preferably 3 to 8K. In this context, the extrapolated onset is taken as the beginning of the melting range, and correspondingly the end of the melting range is taken to be the extrapolated end of the melt curve (heating rate 10K/min). In general, the melting range of the HDPE or MDPE begins at a temperature from 115 to 130° C., preferably at a temperature from 120 to 125° C.

The parameters "melting point" and "melting range" and "beginning of melting range" are determined by DSC measurement and read off from the DSC plot as described in the explanation of measurement methods.

Suitable propylene homopolymers of the shutdown layer contain 98 to 100% by weight, preferably 99 to 100% by weight propylene units and have a melting point (DSC) of 150° C. or higher, preferably 155 to 170° C., and generally a melt flow index from 0.5 to 10 g/10 min, preferably 2 to 8 g/10 min at 230° C., and a force of 2.16 kg (DIN 53735). Preferred propylene homopolymers for the layer are isotactic propylene homopolymers with an n-heptane soluble fraction of less than 15% by weight, preferably 1 to 10% by weight. Isotactic propylene homopolymers high chain isotacticity of at least 96%, preferably 97-99% ($^{13}$C-NMR; triad method), may also be used advantageously. These basic materials are known in the art as HIPP (highly isotactic polypropylene) or HCPP (highly crystalline polypropylene) polymers and are distinguished by the high degree of stereoregularity of their polymer chains, higher crystallinity and a higher melting point (compared with propylene polymers that have a $^{13}$C-NMR isotacticity of 90 to <96%, which may also be used).

The porous layer II of the foil that may be present contains one propylene homopolymer, at least one β-nucleating agent and possibly propylene block copolymer, and possibly standard additives such as stabilisers, neutralisers, in the effective quantities for each.

The porous layer II may also contain other polyolefins besides the propylene homopolymer and the propylene block copolymer, provided they do not impair the properties, particularly the porosity and mechanical strengths, and the shutdown function. Other polyolefins are for example statistical copolymers of ethylene and propylene having an ethylene content of 20% by weight or less, statistical copolymers of propylene with $C_4$-$C_8$-olefins having an olefin content of 20% by weight or less, terpolymers of propylene, ethylene and butylenes having an ethylene content of 10% by weight or less and having a butylenes content of 15% by weight or less, or other polyethylenes such as LDPE, VLDPE, and LLDPE.

Porous layer II generally contains 50 to <100% by weight, preferably 60 to 95% by weight propylene homopolymers and 0 to 50% by weight propylene block copolymers, preferably 5 to 40% by weight, and 0.001 to 5% by weight, preferably 50-10,000 ppm of at least one β-nucleating agent relative to the weight of the layer, and if necessary the additives indicated above, such as stabilisers and neutralisers.

In the event that additional polyolefins are contained in porous layer II, the fraction of the propylene homopolymer or the block copolymer is reduced correspondingly. In general, the quantity of additional polymers will be 0 to <20% by weight, preferably 0.5 to 15% by weight, particularly 1 to 10% by weight, if such are contained as well. Similarly, the propylene homopolymer or propylene block copolymer fraction is reduced if higher quantities of up to 5% by weight nucleating agent are used. In addition, the layer may contain standard stabilisers and neutralisers as well as other additives as necessary, in the usual small quantities of less than 2% by weight.

In general, the porous layer contains no additional HDPE and/or MDPE, in order to optimise the mechanical strength of this layer II. However, that same applies for these HDPEs and MDPEs as for the other added polymers, that small quantities that do not affect the foil properties, particularly the porosity, the shutdown function and the mechanical properties, may be contained. The quantity of HDPEs and MDPEs in porous layer II is less than 5% by weight, particularly in the range from 0-1% by weight.

In general, all known additives that promote the formation of polypropylene β-crystals during cooling of a polypropylene melt are suitable as β-nucleating agents for both layers I and II. Such β-nucleating agents and their mode of action in a polypropylene matrix are known in the related art and will be described in detail in the following.

Various crystalline phases of polypropylene are known. When a melt cools, it is usually the α-crystalline polypropylene that forms in larger quantities, because its melting point is in the approximate range from 158-162° C. With a certain temperature control, a small fraction of the β-crystalline phase may be produced when cooling, with a considerably lower melting point than the monoclinic α-variant, at 148-150° C. Additives are known in the related art that result in an increased fraction of the β-variant when polypropylene is cooled, for example γ-quinacridone, dihydroquinacridine or calcium salts of phthalic acid.

For the purposes of the present invention, highly active β-nucleating agents that preferably yield a β-fraction of 40-950, preferably 50-85% (DSC) when a propylene homopolymer melt (polypropylene fraction 100%) is cooled are used for preference. The β-fraction is determined from the DSC for the cooled propylene homopolymer melt. For example, a two-component β-nucleating system of calcium carbonate and organic dicarboxylic acids is preferred, as described in DE 3610644, which is explicitly included herewith by reference. Particularly advantageous are calcium salts of dicarboxylic acids such as calcium pimelate or calcium suberate, as described in DE 4420989, which is also explicitly included herewith by reference. The dicarboxamides described in EP-0557721, particularly N, N-Dicyclohexyl-2,6-naphthalene dicarboxamide are also suitable β-nucleating agents.

Besides the β-nucleating agents, it is also important to maintain a certain temperature range and dwell times at these temperatures while the melt film is cooling in order to obtain a high fraction of β-crystalline polypropylene. The melt film is preferably cooled at a temperature of 60 to 140° C., particularly 80 to 130° C. The growth of β-crystallites is also promoted by slow cooling, so the take-off speed, that is to say the speed at which the melt film passes over the first chill roller, should be slow so that the necessary dwell times at the selected temperatures are long enough. The take-off speed is preferably less than 25 m/min, particularly 1 to 20 m/min. The dwell time at the respective chill roller temperature is correspondingly 20 to 100 s, preferably 30 to 90 s.

Particularly preferred embodiments of the macroporous foil according to the invention contain 50 to 10,000 ppm, preferably 50 to 5000 ppm, particularly 50 to 2,000 ppm calcium pimelate or calcium suberate as the β-nucleating agent in each layer.

The inventive foil composition of propylene homopolymer, possibly propylene block copolymer, β-nucleating agent and polyethylene exhibits a characteristic patter of at least 3 peaks in the second melt in the DSC measurement during the second heating phase. These peaks are attributable to the α-crystalline phase of the propylene homopolymer, the β-crystalline phase of the propylene homopolymer, and the polyethylene. In a DSC measurement, the foil according to the invention thus has one peak for the polyethylene in the range from 115-145° C., a second peak for the β-crystalline polypropylene in the range from 140-155° C., and a third peak for the α-crystalline polypropylene in the range from 155-175° C.

The microporous membrane foil comprises a single layer or multiple layers. Monolayer embodiments are constructed solely from the shutdown layer. Multilayer embodiments are constructed from the shutdown layer and at least one porous layer II. The thickness of the membrane foil, or of the shutdown layer for monolayer embodiments, is in the range from 10 to 100 μm, preferably 15 to 80 μm. The microporous foil may be subjected to corona, flame or plasma treatment in order to improve filling with electrolytes.

In multilayer embodiments, porous layer II is 9 to 60 μm thick, preferably 15 to 50 μm, and the thickness of shutdown layer I is 1 to 40 μm, preferably 3 to 30 μm.

If necessary, the multilayer microporous foil may also include other porous layers, which are of similar construction to porous layer II, in which case the composition of these additional porous layers may be, but does not have to be identical with that of porous layer II. Triple layer foils preferably have an inner shutdown layer I that is covered on both sides by porous layers II.

The density of the monolayer or multilayer microporous foil is generally in a range from 0.1 to 0.6 g/cm$^3$, preferably from 0.2 to 0.5 g/cm$^3$. For a foil that is intended for use as a separator in batteries, the foil has a Gurley number from 50 to 5000 s, preferably from 100 to 2500 s. The foil's bubble point should not be higher than 350 nm, preferably between 50 and 300 nm, and the average pore diameter should be in the range from 50 to 100 nm, preferably 60-80 nm.

The porous foil according to the invention is preferably produced according to the flat film extrusion or co-extrusion (for multilayer foils) method, which is known in the art. During this method, the mixtures of propylene homopolymer, possibly propylene block copolymer, β-nucleating agent of the respective layer or layers, and polyethylene for the shutdown layer are mixed, melted in an extruder, and (co-)extruded together and simultaneously as required through a flat die and onto a take-off roller on which the mono- or multilayer melt film solidifies and cools, with formation of the β-crystallites. The cooling temperatures and cooling times are selected to ensure that the highest possible fraction of β-crystalline polypropylene forms in the pre-film. Because of the polyethylene fraction in the shutdown layer, the β-crystal content is slightly lower than in pure polypropylene foils with β-nucleating agents. In general, the fraction of β-crystallites in the pre-film is 30-80%, preferably 40-70%. This pre-film with a large fraction of β-crystalline polypropylene is then drawn biaxially so that the β-crystallites are converted into α-polypropylene during the drawing process and a network-like, porous structure is produced. The biaxially drawn foil is finally thermally fixed and if necessary undergoes plasma, corona or flame surface treatment.

Biaxial drawing (orienting) is generally performed sequentially, and in this case preferably first longitudinally (in the machine direction) and then transversely (perpendicular to the machine direction).

The take-off roller or rollers are kept at a temperature of 60 to 135° C., preferably 100 to 130° C., to promote the formation of a high fraction of β-crystalline polypropylene in both or all layers.

During longitudinal drawing, the temperature is lower than 140° C., preferably 70 to 120° C. The longitudinal drawing ratio is in a range from 2:1 to 5:1, preferably 3:1 to 4.5:1. Transverse drawing is carried out at a temperature from 120 to 145° C., and should be selected such that the transverse drawing temperature is not significantly different from the melting point of the polyethylene. In general, the transverse drawing temperature may deviate from the melting point of the polyethylene by 0 to 5° C., preferably by 1 to 3° C., particularly by 2° C., that is to say it may be either higher or lower. The transverse drawing ratio is in a range from 2:1 to 9:1, preferably 3:1 to 8:1.

Lengthwise drawing will be performed most practically with the aid of two rollers running at different speeds corresponding to the desired drawing ratio, and transverse drawing is done using an appropriate tenter.

Biaxial drawing of the foil is generally followed by thermal fixing (heat treatment), wherein the foil is exposed to a temperature from 110 to 140° C. for about 0.5 to 500 s, preferably 10 to 300 s, for example via rollers or an air hot box. The foil is then rolled up in the normal way with a take-up mechanism. The temperature at which thermal fixing takes place should be adjusted such that the temperature the foil reaches as it passes through the fixing field is lower than the melting point of the polyethylene or not more than 1 to 2° C. above it. The foil is then rolled up in the normal way with a take-up mechanism.

As was indicated previously, after biaxial drawing one surface of the foil may be subjected to corona, plasma or flame treatment according to one of the known methods.

The following measuring methods were used to characterize the raw materials and the foils:

Melt Flow Index

The melt flow index was measured according to DIN 53 735 under a load of 2.16 kg and at 230° C. for propylene polymers and at 190° C. and 2.16 kg for polyethylenes.

Melting Points and Melt Ranges

Because of their differing crystalline ranges or phases, semi-crystalline thermoplastic polymers such as propylene polymers do not have a fixed melting point, instead they have a melt range. Melting point and melt range are therefore values that are derived in precisely defined manner from a DSC curve of the respective polymer. In DSC measurement, a quantity of heat per unit of time is applied to the polymer at a defined heating rate and the heat flux is plotted against the temperature, that is to say the change in enthalpy is measured as a deviation in the heat flux from the baseline. The baseline is understood to be the (linear) part of the curve in which no phase transformations take place. Here, a linear relationship exists between the applied heat and the temperature. In the range in which melting processes take place, the heat flux increased by the required melting energy and the DSC curve tends upward. In the range in which most of the crystallites are melting, the curve passes through a maximum and, after all of the crystallites have melted, falls back towards the baseline. For the purposes of the present invention, the melting point is the maximum on the DSC curve. For the purposes of the present invention, the beginning of the melt range is the temperature at which the DSC curve deviates from the baseline and the rise of the DSC curve begins (onset). Similarly, the end of the melt range is the temperature at which the DSC curve has dropped back to the baseline again.

In order to determine the melting point, the width and the beginning of the melt range, the DSC curve is recorded with a heating and cooling rate of 10K/1 min in a range from 20 to 200° C. After the first heating cycle, cooling is carried out at a rate of 10K/1 min in the range from 200 to 20° C. and then the second heating curve (10K/1 min, 20 to 200° C.) is recorded and this heating curve is evaluated.

β-Content of the Pre-Film

The β-content of the pre-film is also determined with a DSC measurement, which is carried out on the pre-film in the following manner: The pre-film is first heated to 220° C. and melted in the DSC at a heating rate of 10K/min, and then cooled again. From this $1^{st}$ heating curve, the degree of crystallinity $K_{\beta,DSC}$ is determined as the ratio of melt enthalpies of the β-crystalline phase ($H_\beta$) to the sum of the melt enthalpies of the β- and α-crystalline phases ($H_\beta + H_\alpha$).

Density

The density is determined in accordance with DIN 53 479, Method A.

Permeability/Gas Permeability (Gurley Number)

The permeability of the foils was measured in accordance with ASTM D 726-58 using the Gurley Tester 4110. The time (in seconds) required by 100 $cm^3$ air to permeate through an area of 1 $Inch^2$ (6.452 $cm^2$) of the specimen is determined. The pressure differential across the foil corresponds to the pressure of a 12.4 cm high column of water. The time required corresponds to the Gurley number.

Shutdown Function

The shutdown function is determined on the basis of Gurley measurements taken before and after thermal treatment at a temperature of 130° C. The Gurley number of the foil is measured as described previously. Then, the foil is exposes to a temperature of 130° C. in a warming oven for five minutes. The Gurley number is then determined again, as described. The shutdown function is operative if the foil has a Gurley value of at least 5000 s and has increased by at least 1000 s after the thermal treatment.

Shrinkage:

The longitudinal and transverse shrinkage values refer to the respective linear length of the foil (longitudinal $L_0$ and transverse $Q_0$) before the shrinking process. The longitudinal direction is the machine direction, the transverse direction is defined accordingly as the direction perpendicular to the machine direction. The test piece having dimensions 10*10 $cm^2$ is shrunk in a circulating air oven at a temperature of 100° C. for 60 minutes. Then, the remaining linear lengths of the test piece are again determined lengthwise and transversely ($L_1$ and $Q_1$). The difference between the measured linear lengths relative to the original lengths $L_0$ and $Q_0$ is then multiplied by 100 and expressed as the shrinkage in a percentage.

$$\text{Lengthwise shrinkage } L_s[\%] = \frac{L0 - L1}{L0} * 100[\%]$$

$$\text{Transverse shrinkage } Q_s[\%] = \frac{Q0 - Q1}{Q0} * 100[\%]$$

This method of determining lengthwise and transverse shrinkage corresponds to DIN 40634.

The invention will now be explained with reference to the following examples.

EXAMPLE 1

In the extrusion process a monolayer pre-film was extruded from a flat die at an extrusion temperature of 240 to 250° C. This pre-film was first drawn off on a chill roller and cooled down. The pre-film was then oriented longitudinally and transversely and finally fixed. The foil had the following composition:

Approximately 80% by weight highly isotactic propylene homopolymerisate (PP) with $^{13}$C-NMR isotacticity of 97% and an n-heptane soluble fraction of 2.5% by weight (relative to 100% PP) and a melting point of 165° C.; and a melt flow index of 2.5 g/10 min at 230° C. and 2.16 kg load (DIN 53 735) and approximately 20% by weight HDPE (High Density Polyethylene) having a density of 0.954 (ISO 1183) and an MFI of 0.4 g/10 min at 190° C. and 2.16 kg load (ISO 1133/D) or 27 g/10 min at 190° C. and 21.6 kg load (ISO 1333/G) and melting point of 130° C. (DSC: peak at 10° C./min heating rate), the melt range begins at 125° C., And 0.04% by weight Ca pimelate as β-nucleating agent.

The film also contained standard low quantities of stabiliser and neutralising agent.

After extrusion, the melted polymer mixture was drawn off and solidified over a first take-off roller and a further roller trio, then drawn lengthwise, drawn transversely and fixed under the following selected conditions:

Extrusion: Extrusion temperature 235° C.
Take-off roller: Temperature 125° C.,
Take-off speed: 4 m/min
Dwell time: 40 s lengthwise drawing:
Drawing roller T=90° C.
Lengthwise drawing by factor 3.0
Transverse drawing: Heating fields T=132° C.
Drawing fields T=132° C.
Transverse drawing by factor 5.0
Fixing: T=130° C.

The porous foil produced in this way was about 25 μm thick and had a density of 0.38 g/cm³ and had an even, white-opaque appearance.

EXAMPLE 2

In a co-extrusion process, a two-layer pre-film (porous layer II and shutdown layer I) was co-extruded from a flat die, each layer at an extrusion temperature of 240 to 250° C. This pre-film was first drawn off on a chill roller and cooled down. The pre-film was then oriented longitudinally and transversely and finally fixed. The foil had the following composition:

Shutdown Layer I:

Approximately 80% by weight highly isotactic propylene homopolymerisate (PP) with $^{13}$C-NMR isotacticity of 97% and an n-heptane soluble fraction of 2.5% by weight (relative to 100% PP) and a melting point of 165° C.; and a melt flow index of 2.5 g/10 min at 230° C. and 2.16 kg load (DIN 53 735) and approximately 20% by weight HDPE (High Density Polyethylene) having a density of 0.954 (ISO 1183) and an MFI of 0.4 g/10 min at 190° C. and 2.16 kg load (ISO 1133/D) or 27 g/10 min at 190° C. and 21.6 kg load (ISO 1333/G) and melting point of 130° C. (DSC: peak at 10° C./min heating rate), the melt range begins at 125° C. and ends at 133° C., and 0.04% by weight Ca pimelate as β-nucleating agent Porous Layer II:

Approximately 80% by weight highly isotactic propylene homopolymerisate (PP) with $^{13}$C-NMR isotacticity of 97% and an n-heptane soluble fraction of 2.5% by weight (relative to 100% PP) and a melting point of 165° C.; and a melt flow index of 2.5 g/10 min at 230° C. and 2.16 kg load (DIN 53 735) and approximately 20% by weight propylene-ethylene block copolymerisate with an ethylene component of 5% by weight relative to the block copolymer and an MFI (230° C. and 2.16 kg) of 6 g/10 min and a melting point (DSC) of 165° C. and 0.04% by weight Ca pimelate as β-nucleating agent.

The film also contained standard low quantities of stabiliser and neutralising agent in both layers.

In detail, the following conditions and temperatures were selected for production of the foil:

Extrusion: Extrusion temperature 235° C.
Take-off roller: Temperature 125° C.,
Take-off speed: 4 m/min
Lengthwise drawing: Drawing roller T=90° C.
Lengthwise drawing by factor 4.3
Transverse drawing: Heating fields T=129° C.
Drawing fields T=129° C.
Transverse drawing by factor 5.0
Fixing: T=130° C.

The porous foil produced in this way was about 25 μm thick, of which the shutdown layer represented 12 μm of the total thickness. The foil had a density of 0.38 g/cm³ and had an even, white-opaque appearance.

EXAMPLE 3

A two-layer foil was produced as described in example 2. In contrast to example 2, the fraction of propylene homopolymer was reduced to 75% by weight and the fraction of HDPE increased to 25% by weight in the shutdown layer. The composition of porous layer II and the process conditions were unchanged. The porous foil produced in this way was approximately 28 μm thick, each layer thereof being 14 μm thick. The foil had a density of 0.42 g/cm³ and had an even, white-opaque appearance.

EXAMPLE 4

A two-layer foil was produced as described in example 2. In contrast to example 2, the HDPE in the shutdown layer was replaced with an MDPE having a density of 0.954 (ISO 1183) and an MFI of 0.4 g/10 min at 190° C. and 2.16 kg load (ISO 1133/D) or 27 g/10 min at 190° C. and 21.6 kg load (ISO 1333/G) and a melting point of 125° C. (DSC: peak at 10° C./min heating rate). The melt range of the MDPE is between 120-127° C. Moreover, the transverse drawing temperature (heating fields) was set to 128° C., lower than in example 2. The rest of the composition of porous layer II and all other process conditions were unchanged. The drawn foil was 30 μm thick, each layer thereof being approximately 15 μm thick. The foil had a density of 0.42 g/cm³ and had an even, white-opaque appearance

COMPARISON EXAMPLE 1

A foil was produced as described in example 2. In contrast to example 2, the foil did not include a shutdown layer and comprised only the porous layer II, the thickness of which was increased correspondingly. The foil was thus produced as a monolayer foil. The composition of porous layer II and the process conditions were unchanged. The foil had a white-opaque appearance, a thickness of 25 μm and a density of 0.38 g/cm³.

COMPARISON EXAMPLE 2

A foil was produced as described in example 1. The composition of the foil was unchanged. In contrast to example 1, in this case the foil was transverse drawn at a temperature of 135° C. The porous foil thus produced was 25 μm thick, had a density of 0.38 g/cm³ and a white-opaque appearance.

COMPARISON EXAMPLE 3

A foil was produced as described in example 1. In contrast to example 1, the foil additionally contained 20% by weight of a propylene-ethylene block copolymerisate with an ethylene fraction of 5% by weight relative to the block copolymer and an MFI (230° C. and 2.16 kg) of 6 g/10 min and a melting point (DSC) of 165° C. The fraction of propylene homopolymer as reduced correspondingly from 80 to 60% by weight. The transverse drawing temperature was also lowered to 125° C. The rest of the composition and the other process parameters were unchanged. The porous foil produced in this way was approximately 25 μm thick and had a density of 0.38 g/cm³, and presented an even, white-opaque appearance.

TABLE

| Example | Gurley no. | Gurley no. after thermal treatment (5 min @ 130° C.) [s] | Shrinkage (60 min @ 100° C.) MD/TD[s] | E-modulus in MD/TD [N/mm²] |
|---|---|---|---|---|
| Ex.: 1 | 480 | 9,000 | 3/3 | 1020/2100 |
| Ex.: 2 | 400 | 10,000 | 3/3 | 1150/2000 |
| Ex.: 3 | 620 | 100,000 | 3/3 | 1050/1800 |
| Ex.: 4 | 780 | 45,000 | 3/3 | 1050/2080 |
| Comp. ex.: 1 | 400 | 600 | 6/6 | 1080/1260 |
| Comp. ex.: 2 | 5600 | 18,500 | 3/3 | 1120/2120 |
| Comp. ex.: 3 | 350 | 9,000 | 6/7 | 1020/2100 |

The invention claimed is:

1. A monolayer or multilayer, biaxially oriented microporous foil with shutdown function whose microporosity is produced by the conversion of β-crystalline polypropylene when the foil is drawn, and which comprises at least one shutdown layer I, wherein the shutdown layer contains propylene homopolymer and less than 1% by weight propylene block copolymer and at least one β-nucleating agent and polyethylene, and wherein the foil has a Gurley number of 50 to 5000 s, an E-modulus in the lengthwise direction of 300 to 1800 N/mm2 and in the transverse direction of 500 to 3000 N/mm2, and after exposure to a temperature of 130° C. for five minutes the foil has a Gurley number of at least 5000 s, the Gurley value being at least 1000 s higher after this temperature treatment than before.

2. The foil of claim 1, wherein the polyethylene in shutdown layer I has a melting point of from 115 to 140° C.

3. The foil of claim 1, wherein melt range of the polyethylene in shutdown layer I has a width not exceeding 10K.

4. The foil of claim 1, wherein the polyethylene in shutdown layer I is an HDPE or an MDPE.

5. The foil of claim 1, wherein shutdown layer I contains from 15 to 55% by weight polyethylene relative to the weight of shutdown layer I.

6. The foil of claim 1, wherein shutdown layer I contains 45 to 85% by weight propylene homopolymer and 50 to 10,000 ppm β-nucleating agent.

7. The foil of claim 1, wherein the propylene homopolymer is a highly isotactic polypropylene with a chain isotaxy (13C-NMR) of 96 to 99%.

8. The foil of claim 1, wherein the propylene homopolymer is an isotactic polypropylene with a chain isotaxy (13C-NMR) of 90 to less than 96%.

9. The foil of claim 1, wherein the nucleating agent is a calcium salt of pimelic acid or of suberic acid or is a carboxamide.

10. The foil of claim 1, wherein the foil has at least one additional porous layer II.

11. The foil of claim 10, wherein porous layer II contains 50 to 85% by weight propylene homopolymer, 15 to 50% by weight propylene block copolymer and 50 to 10,000 ppm β-nucleating agent.

12. The foil of claim 1, wherein porous layer II contains from 0 to 5% by weight HDPE and/or MDPE.

13. The foil of claim 1, wherein the foil comprises a further porous layer, which contains propylene homopolymer and propylene block copolymer and β-nucleating agent.

14. The foil of claim 1, wherein the density of the foil is in a range from 0.1 to 0.6 g/cm3.

15. The foil of claim 1, wherein the foil has a Gurley number of 50 to 5000 s, and after it has been exposed to a temperature of 130° C. for five minutes, a Gurley number of at least 8000 s.

16. The foil of claim 1, wherein the foil has a thickness of 10 to 100 μm.

17. A method for producing the foil of claim 1, wherein the foil is produced according to a flat film extrusion method and a take-off roller temperature is in a range from 60 to 130° C.

18. The method of claim 17, wherein an undrawn pre-film has a β-crystallite content of 30 to 80%.

19. The method of claim 17, wherein the foil is drawn transversely at a temperature that is not more than 2° C. higher or lower than the melting point of the polyethylene.

20. A separator in batteries or rechargeable batteries comprising the foil of claim 1.

21. The foil of claim 1, wherein the foil has a Gurley number of 120 to 800 s, an E-modulus in the lengthwise direction of 600 N/mm² to 1200 N/mm² and in the transverse direction of greater than 500 to 3000 N/mm², and after exposure to a temperature of 130° C. for five minutes the foil has a Gurley number of 10,000 to 250,000 s, the Gurley value being at 10,000 to 200,000 s higher after this temperature treatment than before.

22. The foil of claim 1, wherein the foil has a Gurley number of 120 to 800 s, an E-modulus in the lengthwise direction of 600 to 1200 N/mm² and in the transverse direction of 1000 to 2500 N/mm².

* * * * *